United States Patent
Tsubaki et al.

(10) Patent No.: US 7,563,853 B2
(45) Date of Patent: Jul. 21, 2009

(54) POLYMER COMPOUND, PROCESS FOR PRODUCING THE SAME, POLYMER-CONTAINING COMPOSITION, INK-APPLYING PROCESS, AND INK-APPLYING APPARATUS

(75) Inventors: Keiichiro Tsubaki, Kawasaki (JP); Masayuki Ikegami, Atsugi (JP); Koichi Sato, Atsugi (JP); Ikuo Nakazawa, Zama (JP); Ryuji Higashi, Atsugi (JP); Sakae Suda, Sagamihara (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 11/118,400

(22) Filed: May 2, 2005

(65) Prior Publication Data

US 2006/0004124 A1 Jan. 5, 2006

(30) Foreign Application Priority Data

May 7, 2004 (JP) ............................. 2004-139193

(51) Int. Cl.
*C08F 130/08* (2006.01)
(52) U.S. Cl. ................... 526/279; 523/160; 523/161; 347/100; 347/95
(58) Field of Classification Search ................. 526/279; 523/160, 161; 347/100, 95
See application file for complete search history.

(56) References Cited

U.S. PATENT DOCUMENTS

| | | | | |
|---|---|---|---|---|
| 4,313,124 A | 1/1982 | Hara | ...................... | 346/104 R |
| 4,345,262 A | 8/1982 | Shirato et al. | ........... | 346/140 R |
| 4,459,600 A | 7/1984 | Sato et al. | ............... | 346/140 R |
| 4,463,359 A | 7/1984 | Ayata et al. | ................... | 346/1.1 |
| 4,558,333 A | 12/1985 | Sugitani et al. | ......... | 346/140 R |
| 4,723,129 A | 2/1988 | Endo et al. | .................. | 346/1.1 |
| 4,740,796 A | 4/1988 | Endo et al. | .................. | 346/1.1 |
| 5,085,698 A | 2/1992 | Ma et al. | ...................... | 106/20 |
| 7,004,579 B2 | 2/2006 | Sato et al. | ................... | 347/105 |
| 7,216,965 B2 * | 5/2007 | Morioka et al. | ............. | 347/100 |
| 2002/0186288 A1 | 12/2002 | Nakazawa et al. | .......... | 347/100 |
| 2003/0050364 A1 | 3/2003 | Sato et al. | ................... | 523/160 |
| 2005/0033010 A1 | 2/2005 | Sato et al. | ..................... | 528/80 |
| 2005/0131102 A1 | 6/2005 | Nakazawa et al. | .......... | 523/160 |
| 2005/0140762 A1 | 6/2005 | Sato et al. | .................... | 347/100 |
| 2005/0197424 A1 | 9/2005 | Higashi et al. | ............... | 523/160 |
| 2005/0209367 A1 | 9/2005 | Sato et al. | .................... | 523/161 |
| 2005/0219277 A1 | 10/2005 | Sato et al. | ...................... | 347/1 |
| 2005/0239918 A1 | 10/2005 | Nakazawa et al. | .......... | 523/160 |
| 2005/0249925 A1 | 11/2005 | Ikegami et al. | ........... | 428/195.1 |
| 2006/0047015 A1 | 3/2006 | Duda et al. | .................. | 523/160 |
| 2006/0050117 A1 | 3/2006 | Sato et al. | .................... | 347/100 |
| 2006/0057485 A1 | 3/2006 | Teshima et al. | .......... | 430/108.8 |

FOREIGN PATENT DOCUMENTS

| | | |
|---|---|---|
| JP | 59-123670 | 7/1984 |
| JP | 59-138461 | 8/1984 |
| JP | 11-322942 | 11/1999 |
| WO | 2004/061022 | * 7/2004 |

OTHER PUBLICATIONS

Sadahito Aoshima et al., "Living Cationic Polymerization of Vinyl Monomers by Organoaluminium Halides", Polymer Bulletin, vol. 15, pp. 417-423 (1986).

* cited by examiner

*Primary Examiner*—Margaret G Moore
(74) *Attorney, Agent, or Firm*—Fitzpatrick, Cella, Harper & Scinto

(57) ABSTRACT

A polymer compound of a block polymer containing at least three block segments each having a repeating unit structure comprising a polyalkenyl ether structure comprises a repeating unit structure having a silyl ether side chain represented by the formula (1) in at least one block segment of the block polymer and a repeating unit structure containing one kind or two or more kinds of either a side chain having an ionic functional group represented by the formula (2) or an ester-type functional group obtained by esterifying the ionic functional group in at least one other block segment.

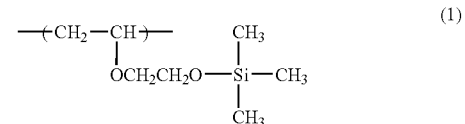

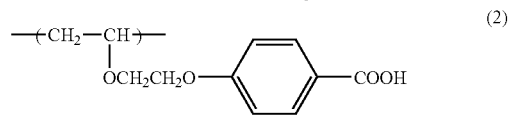

8 Claims, 1 Drawing Sheet

POLYMER COMPOUND, PROCESS FOR PRODUCING THE SAME, POLYMER-CONTAINING COMPOSITION, INK-APPLYING PROCESS, AND INK-APPLYING APPARATUS

BACKGROUND OF THE INVENTION

1. Field of the Invention

The present invention relates to a novel polymer composition useful in various functional materials, a polymer-containing composition, an ink composition, an ink-applying process, and an ink-applying apparatus. Particularly preferably, it relates to an ink composition and a toner composition using the polymer compound together with a solvent or dispersing medium, and a color material, and an ink-applying process and an ink-applying apparatus using the composition.

2. Description of the Related Art

As aqueous dispersion materials containing functional substances, pesticides such as herbicides and insecticides, medicaments such as anticancer agents, antiallergic agents and antiinflammatory agents, and color materials such as ink and toner having a colorant are hitherto well known as functional materials. Recently, digital printing technologies have advanced very rapidly. The digital printing technologies include so-called electrophotographic technology and ink-jet technology as representative examples and increasingly show their presence as image-forming technologies in offices, homes, and the like.

Among them, ink-jet technology has characteristics of compact size and low electric power consumption as a direct recording process. Moreover, a higher quality image has been rapidly developed by miniaturization of nozzles and the like. One example of ink-jet technology is a process of evaporating and foaming ink supplied from an ink tank by heating the ink with a heater in a nozzle to inject the ink, whereby an image is formed. Another example is a process of injecting ink from a nozzle by vibrating a piezoelectric element.

Since an aqueous dye solution is used as the ink to be used in these processes, bluffing may sometimes occur at the time when colors are overlapped and a phenomenon called feathering may appear in the fiber direction of paper at recorded portions on a recording medium. In order to remedy these problems, use of pigment-dispersed ink has been investigated (U.S. Pat. No. 5,085,698). However, further improvement is still desired.

SUMMARY OF THE INVENTION

The present invention has been accomplished in consideration of the above circumstances and it provides a polymer compound suitable for satisfactorily dispersing functional substances such as color materials and solid matter for use in ink compositions and toner compositions.

Moreover, the present invention provides compositions and recording materials such as an ink composition and a toner composition wherein a color material is satisfactorily dispersed by mixing the polymer compound together with a solvent or dispersing medium and a color material.

Furthermore, the present invention provides an ink-applying process and an ink-applying apparatus using recording materials such as an ink composition and toner composition using the polymer compound.

As a result of extensive studies on the above conventional technologies and problems, the present inventors have completed the present invention shown below.

Namely, the present invention is directed to a polymer compound of a block polymer containing at least three block segments, each having a repeating unit structure comprising a polyalkenyl ether structure, which comprises a repeating unit structure represented by the following general formula (1) in at least one block segment of the block polymer and a repeating unit structure represented by the following general formula (2) in at least one other block segment.

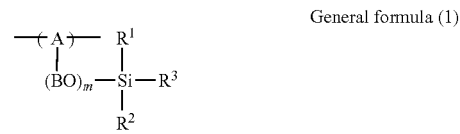

General formula (1)

wherein A represents a polyalkenyl ether group which may be substituted; B represents a linear or branched alkylene group having 1 to 15 carbon atoms which may be substituted; m represents an integer of 1 to 30 and, in the case that m is two or more, the B groups may be the same or different from each other; $R^1$, $R^2$, and $R^3$ each represent a linear or branched alkyl group having 1 to 10 carbon atoms which may be substituted or an aromatic ring which may be substituted; and $R^1$, $R^2$, and $R^3$ may be the same in structure or different in structure from each other;

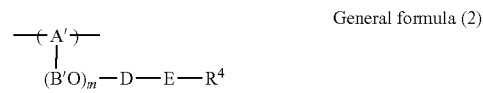

General formula (2)

wherein A' represents a polyalkenyl ether group which may be substituted; B' represents a linear or branched alkylene group having 1 to 15 carbon atoms which may be substituted; m represents an integer of 1 to 30 and, in the case that m is two or more, the B' groups may be the same or different from each other; D represents a single bond or a linear or branched alkylene group having 1 to 10 carbon atoms which may be substituted; E represents any of a single bond, an aromatic ring which may be substituted, a condensed ring which may be substituted, or a structure where up to three aromatic rings which may be substituted are bonded via single bond(s); $R^4$ represents —COOH, —COOR$^5$, or —COO$^-$M; $R^5$ represents a linear or branched alkyl group having 1 to 5 carbon atoms which may be substituted or an aromatic ring which may be substituted; M represents a monovalent or multivalent metal cation; and the hydrogen atom(s) on the aromatic ring of the above E may be substituted by halogen atom(s).

Moreover, the present invention is a process for producing a polymer compound comprising a step of obtaining a block segment containing a repeating unit structure represented by the following general formula (3) by hydrolyzing a silyl ether side chain of —SiR$_1$R$_2$R$_3$ of the repeating unit structure represented by the general formula (1) in the above polymer compound into a hydroxyl group.

General formula (3)

wherein A represents a polyalkenyl ether group which may be substituted; B represents a linear or branched alkylene group having 1 to 15 carbon atoms which may be substituted; m represents an integer of 1 to 30, and in the case that m is two or more, the B groups may be the same or different from each other.

Moreover, the present invention is directed to a polymer-containing composition comprising the above polymer compound, a solvent or dispersing medium, and a functional substance.

Additionally, the present invention is directed to a toner composition comprising the above polymer compound, a dispersing medium, and a color material.

Furthermore, the present invention is directed to an ink composition comprising the above polymer compound, a solvent or dispersing medium, and a color material.

Moreover, the present invention is directed to an ink-applying process comprising a step of applying the above ink composition to a medium.

Additionally, the present invention is directed to an ink-applying apparatus comprising ink-applying means for imparting energy to the above ink composition to apply ink to a medium and drive means for driving the ink-applying means.

According to the above present invention, there is provided a polymer compound capable of homogeneously and stably dispersing a functional substance such as pigment in a solvent. Moreover, there is provided a polymer-containing composition and an ink composition containing the polymer compound and a functional substance such as pigment is dispersed in a solvent. Furthermore, the present invention can provide an ink-applying process and an ink-applying apparatus applying the polymer-containing composition.

The present invention can provide a polymer compound suitable for satisfactorily dispersing a functional substance such as a color material or solid matter for use in ink compositions and toner compositions.

Moreover, the polymer composition of the present invention can provide compositions and recording materials such an ink composition and a toner composition wherein a color material is satisfactorily dispersed.

Furthermore, there is provided an ink-applying process and an ink-applying apparatus using recording materials such as the ink composition and the toner composition using the polymer compound of the invention.

DESCRIPTION OF THE EMBODIMENTS

Figure 1:
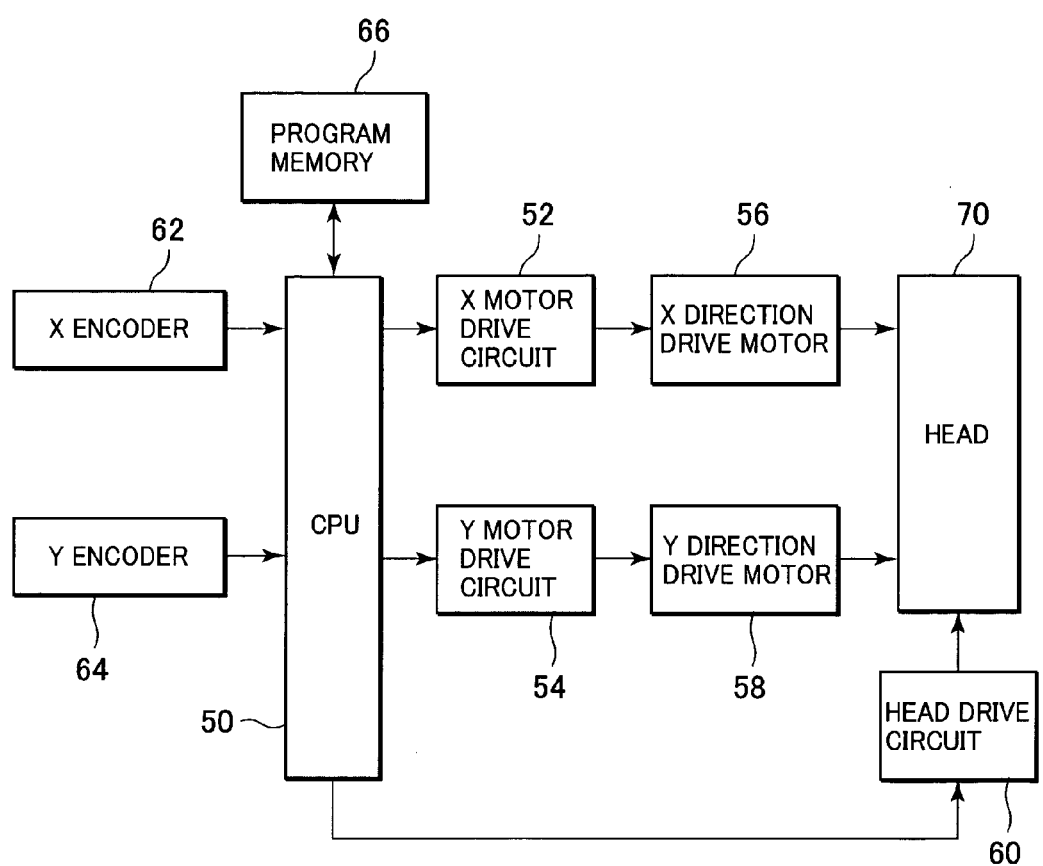
FIG. 1 is a block diagram showing the constitution of an ink-jet recording apparatus.

The following will describe the present invention in detail.

In the general formula (1), A represents a polyalkenyl ether group which may be substituted. The polyalkenyl group is a group wherein a vinyl group which may be substituted is polymerized and the above vinyl group may be substituted by a linear or branched alkylene group having 1 to 5 carbon atoms or a halogen atom.

B represents a linear or branched alkylene group having 1 to 15 carbon atoms which may be substituted. Examples of the substituent of the above alkylene group include ethylene, propylene, butylene, and the like.

m represents an integer of 1 to 30, preferably 1 to 10. In the case that m is two or more, the B groups may be the same or different from each other.

$R^1$, $R^2$, and $R^3$ represent each a linear or branched alkyl group having 1 to 10, preferably 1 to 5, carbon atoms which may be substituted or an aromatic ring which may be substituted. $R^1$, $R^2$, and $R^3$ may be the same in structure or different in structure from each other. Examples of the above alkyl group include methyl, ethyl, propyl, butyl, t-butyl, and the like. Examples of the aromatic ring include a phenyl group, a pyridyl group, and the like.

In the general formula (2), A' represents a polyalkenyl ether group which may be substituted. The alkylene group constituting the polyalkenyl group may be substituted by a linear or branched alkylene group having 1 to 5 carbon atoms or a halogen atom.

B' represents a linear or branched alkylene group having 1 to 15 carbon atoms which may be substituted. Examples of the substituent of the above alkylene group include ethylene, propylene, butylene, and the like.

Symbol m represents an integer of 0 to 30, preferably 1 to 10. In the case that m is two or more, the B' groups may be the same or different from each other.

D represents a single bond or a linear or branched alkylene group having 1 to 10 carbon atoms which may be substituted. Examples of the alkylene group include methylene, ethylene, propylene, butylene, pentylene, hexylene, heptylene, octylene, and the like.

E represents any of a single bond, an aromatic ring which may be substituted, a condensed ring which may be substituted, or a structure where up to three aromatic rings which may be substituted are bonded via single bond(s). Examples of the aromatic ring structure include phenyl, naphthyl, anthranyl, phenanthryl, thiphenyl, franyl, and the like.

$R^4$ represents any of —COOH, —COOR$^5$, and —COO$^-$M. $R^5$ represents a linear or branched alkyl group having 1 to 5 carbon atoms which may be substituted or an aromatic ring which may be substituted. Examples of the aromatic ring structure include a phenyl group, a pyridyl group, a biphenyl group, and the like. Examples of the substitutent thereof include an alkyl group, an alkoxy group, and the like. M represents a monovalent or multivalent metal cation. Specific examples of M include sodium, potassium, lithium, and the like as monovalent metal cations and magnesium, calcium, nickel, iron, and the like as multivalent metal cations. In the case that M is a multivalent metal cation, M forms a counter ion with two or more anions COO$^-$.

$R^4$ in the formula represents that a hydrogen atom in the aromatic ring of E is substituted. Moreover, in the above aromatic ring, the hydrogen atom(s) which is(are) not substituted by $R^4$ may be substituted. Examples of the substituent thereof include an alkyl group, an alkoxy group, a halogen atom, and the like.

The repeating unit structure represented by the general formula (1) is characterized in that it has a substituted silyl ether side chain. In the case that a bulky substituent such as a t-butyl group or a phenyl group is bonded to at least one of the substituents $R^1$, $R^2$, and $R^3$ of the silyl ether side chain, durability against an aqueous alkali solution is enhanced in hydrolysis and hence selective hydrolysis with an acid becomes possible depending on the kind of the substituent of the silyl ether side chain. Specific examples of the repeating unit structure represented by the general formula (1) include the structures shown below but the polymer compound of the invention is not limited thereto.

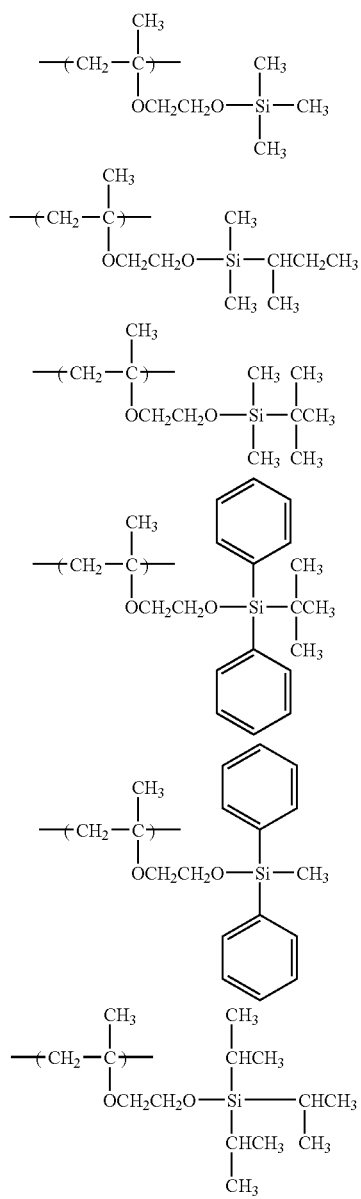

Moreover, examples of more preferred structures of the above repeating unit structure represented by the general formula (1) include the structures shown below.

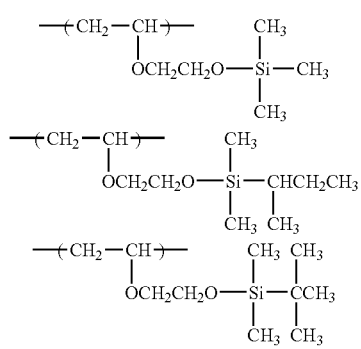

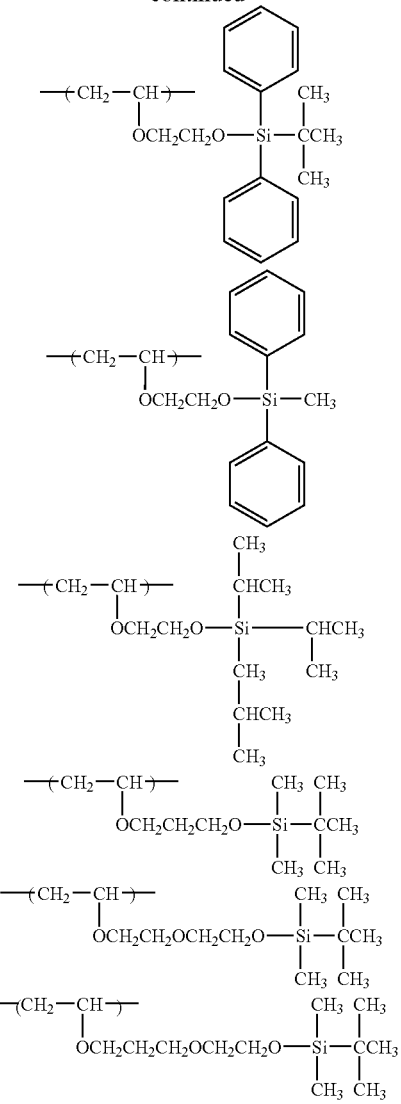

The repeating unit structure represented by the general formula (2) forms an ionic hydrophilic block in the case that $R^4$ contains a large number of —COOH and —COO⁻M, and it forms a hydrophobic block in the case that $R^4$ contains a large number of —COOR⁵. The former is obtained by hydrolyzing the latter with an alkali, followed by neutralization with an acid or the like. The structure represented by $R^4$ may be present as one kind thereof in the above block segment or —COOH, —COOR⁵, and —COO⁻M may be present in combination.

Moreover, specific examples of the repeating unit structure represented by the general formula (2) include the structures shown below.

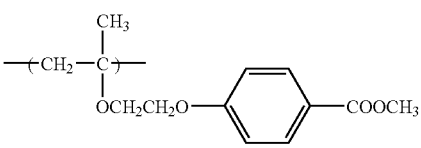

-continued
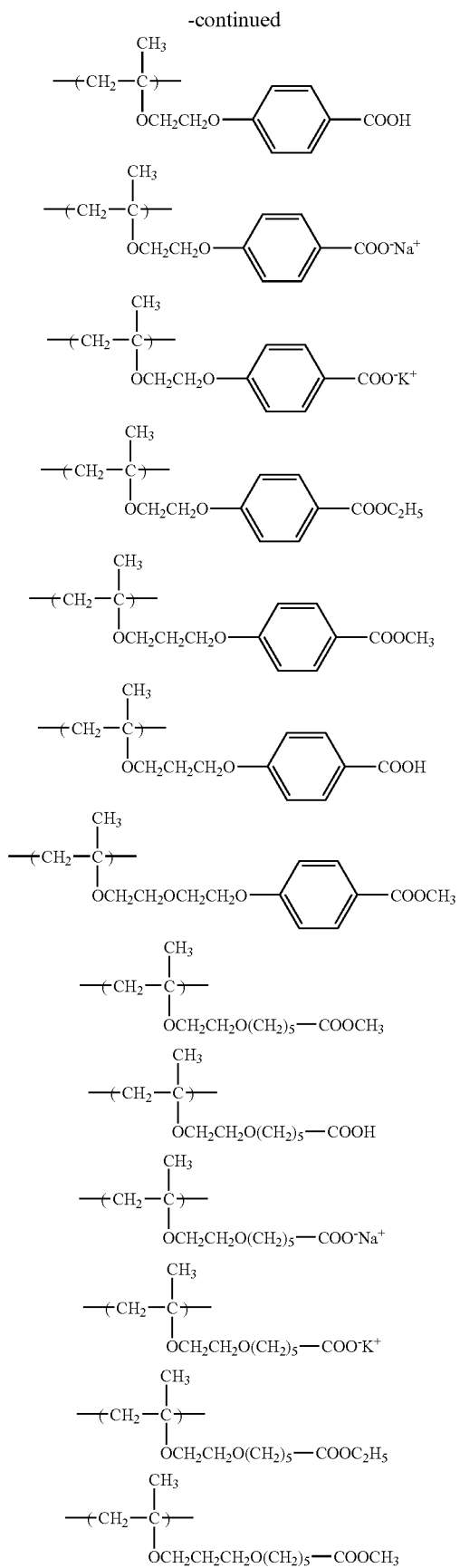
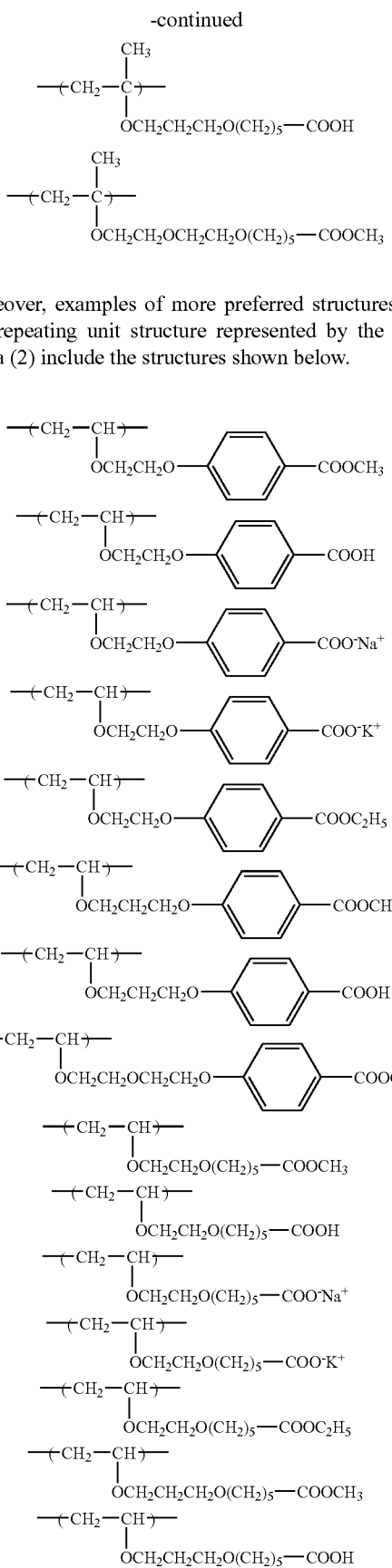
Moreover, examples of more preferred structures of the above repeating unit structure represented by the general formula (2) include the structures shown below.

-continued

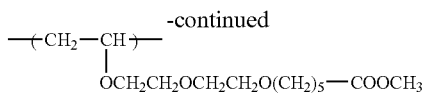

One more preferred aspect of the polymer compound of the present invention is a polymer compound of an ABC-type triblock polymer comprising three different block segments containing a polyalkenyl ether structure as the repeating unit structure. The A block is a hydrophobic block segment, the B block is a block segment having a silyl ether side chain containing a repeating unit structure represented by the general formula (1), and the C block is a block segment containing a repeating unit structure having one kind or two or more kinds of either an ionic hydrophilic group represented by the general formula (2) or an esterified ionic hydrophilic group.

Examples of the hydrophobic block include block segments containing a repeating unit structure having a hydrophobic unit such as a t-butyl group, a phenyl group, a biphenyl group, or a naphthyl group. Specific examples include block segments having a hydrophobic monomer such as styrene or t-butyl methacrylate as the repeating unit and preferred are block segments having a repeating unit structure comprising a polyalkenyl ether structure. Specifically, the repeating unit structure represented by the following general formula (4) may be mentioned, but the hydrophobic block in the polymer compound of the invention is not limited thereto.

General formula (4)

wherein A' represents a polyalkenyl ether group which may be substituted; B represents a linear or branched alkylene group having 1 to 15 carbon atoms which may be substituted; m represents an integer of 1 to 30 and, in the case that m is two or more, the B groups may be the same or different from each other; J represents any of a linear or branched alkyl group having 3 to 15 carbon atoms which may be substituted, an aromatic ring which may be substituted, a condensed ring which may be substituted, or a structure where up to three aromatic rings which may be substituted are bonded via single bond(s).

In the general formula (4), A' represents a polyalkenyl ether group which may be substituted. The alkenyl group constituting the polyalkenyl group may be substituted by a linear or branched alkylene group having 1 to 5 carbon atoms or a halogen atom.

B represents a linear or branched alkylene group having 1 to 15 carbon atoms which may be substituted. Examples of the substituent of the above alkylene group include ethylene, propylene, butylene, and the like.

m represents an integer of 0 to 30, preferably 1 to 10. In the case that m is two or more, the B groups may be the same or different from each other.

J represents any of a linear or branched alkyl group having 3 to 15 carbon atoms which may be substituted, an aromatic ring which may be substituted, a condensed ring which may be substituted, or a structure where up to three aromatic rings which may be substituted are bonded via single bond(s). Examples of the above alkyl group include propyl, butyl, t-butyl, and the like. Examples of the aromatic ring structure include a phenyl group, a naphthyl group, a pyridyl group, a biphenyl group, and the like. Examples of the substitutent include an alkyl group, an alkoxy group, and the like.

Specific examples of the repeating unit structure to be a hydrophobic block include the following structures but are not limited thereto.

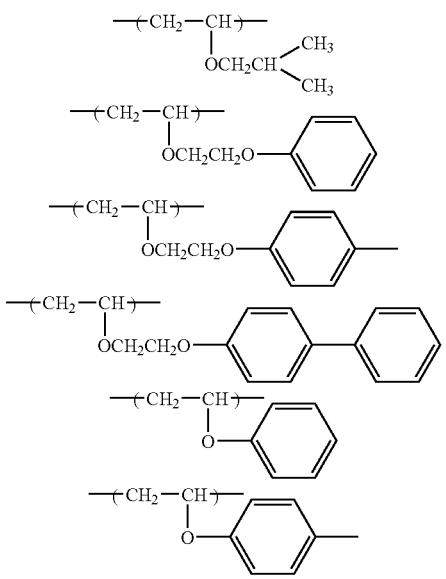

Moreover, each block segment of the polymer compound of the present invention may be composed of a repeating unit derived from a single monomer or may be a structure having repeating units derived from two or more monomers. Examples of the block segment having repeating units derived from two or more monomers include random copolymers and gradient copolymers wherein the composition ratio gradually changes. Furthermore, the polymer compound of the present invention may be a polymer wherein the above-mentioned block polymer is grafted to another polymer.

In the present invention, it is desirable that the content of the repeating unit structure represented by the general formula (1) to be contained in the polymer compound is from 0.01 to 99 mol %, preferably from 1 to 90 mol % based on the whole polymer compound. This range is preferred because when the content is 0.01 mol %, or more, a preferable dispersion stability is obtained and, when it is 99 mol % or less, a structure in which the functional substance is effectively encapsulated is obtained.

In the present invention, it is desirable that the content of the repeating unit structure represented by the general formula (2) to be contained in the polymer compound is from 2 to 98 mol %, preferably from 5 to 95 mol % based on the whole polymer compound. This range is preferred because when the content is 2 mol % or more, a preferable dispersion stability is obtained and, when it is 98 mol % or less, a structure in which the functional substance is effectively encapsulated is obtained.

The number average molecular weight (Mn) is from 400 to 10,000,000, and a preferable range thereof is from 1,000 to 1,000,000. When the weight is 10,000,000 or less, intertwining within a polymer chain and between polymer chains is small and hence the polymer compound is easy to disperse. When the weight is 400 or more, a preferable steric effect as a polymer is obtained. A preferable degree of polymerization of each block segment is independently from 2 to 10,000, more preferably from 2 to 5,000, and still more preferably from 2 to 4,000.

The polymerization of the polymer compound of the present invention is carried out as a cationic polymerization in most cases. Examples of the initiator include protonic acids such as hydrochloric acid, sulfuric acid, methanesulfonic acid, trifluoroacetic acid, trifluoromethanesulfonic acid, and perchloric acid, combinations of cation sources and Lewis acids such as $BF_3$, $AlCl_3$, $TiCl_4$, $SnCl_4$, $FeCl_3$, $RAlCl_2$, $R_{1.5}AlCl_{1.5}$ (R represents an alkyl) (the cation sources include protonic acids and water, alcohols, and adducts of vinyl ethers with carboxylic acids). The polymerization reaction proceeds by the coexistence of these initiators and polymerizable compounds (monomers), whereby polymer compounds can be synthesized.

A more preferable polymerization method used in the present invention will be described. Methods for synthesizing polymers containing polyvinyl ether structures have been reported and a representative method is a method of cationic living polymerization reported by Aoshima, et al. (Polymer Bulletin, Vol. 15, 417 (1986); Japanese Patent Laid-Open No. 322942/1999). By conducting polymer synthesis through cationic living polymerization, various polymers such as homopolymers, copolymers composed of two or more components of monomers, and block polymers, graft polymers, and gradient polymers can be synthesized with an exactly uniform length (molecular weight). Furthermore, the living polymerization also can be conducted using an $HI/I_2$ system, an $HCl/SnCl_4$ system, or the like.

Since the polymer compound preferably used in the invention has a block segment containing a repeating unit structure having a carboxylic acid or a carboxylate ester or a carboxylate salt, not in the form of directly bonding to the main chain of the polymer but through a certain connecting group, interactions suitable for forming a high-order structure or a highly stable dispersion can be exhibited. Moreover, since the compound contains three or more block segments, it is possible to exhibit three or more functions. Therefore, it is possible to form a higher-order and finer structure as compared with a polymer compound having two or fewer block segments. Furthermore, by retaining a similar property in two or more block segments, it is possible to further stabilize the dispersion.

The polymer compound of the invention is characterized by containing a block segment having the repeating unit structure of the above general formula (2) and also characterized by the presence of two or more carboxylic acids or carboxylate esters or carboxylate salts in the repeating unit structure. According to a process for producing a polymer compound having a hydroxyl group to be mentioned below, there is obtained a polymer-containing composition having a hydroxyl group and a carboxylic acid group, which is excellent in dispersion stability and fixing ability. The polymer compound of the present invention is extremely useful as a precursor for the compound.

Additionally, the second aspect of the present invention is a process for producing a polymer compound comprising a step of obtaining a block segment containing a repeating unit structure represented by the following general formula (3) by hydrolyzing a silyl ether side chain of $—SiR^1R^2R^3$ of the repeating unit represented by the general formula (1) in the polymer compound according to the above first aspect into a hydroxyl group.

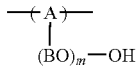

General formula (3)

wherein A represents a polyalkenyl ether group which may be substituted; B represents a linear or branched alkylene group having 1 to 15 carbon atoms which may be substituted; m represents an integer of 1 to 30 and, in the case that m is two or more, the B groups may be the same or different from each other.

The resulting polymer compound of the present invention is a polymer compound of a block polymer containing at least three block segments each having a repeating unit structure comprising a polyalkenyl ether structure, which comprises a repeating unit structure represented by the above general formula (3) in at least one block segment of the above block polymer and a repeating unit structure represented by the above general formula (2) in at least one other block segment.

The third aspect of the present invention will be described.

The third aspect of the present invention is a polymer-containing composition comprising any of the polymer compounds of the first aspect and the second aspect of the present invention, a solvent or dispersing medium, and a functional substance.

The composition of the present invention preferably contains the above polymer compound, a color material, and a functional substance exhibiting a useful predetermined function, and the above polymer compound can be suitably used for dispersing the color material, the functional substance, and the like satisfactorily. A pigment, a metal, a herbicide, an insecticide, or a biological material such as a drug can be also used. Moreover, the polymer compound in the first aspect of the present invention, wherein the repeating unit structure represented by the general formula (2) is other than an ester and the polymer compound of the second aspect of the present invention can be used as satisfactory water-soluble polymer compounds and they can be also used as adhesives, sticking agents, and the like, so that they may be used without the presence of a functional substance.

The functional substance to be contained in the composition of the present invention is preferably in an amount of 0.1 to 50% by total weight based on the weight of the composition. Also, it may be a soluble substance, and a dye, a molecular catalyst, and the like can be also employed.

Moreover, the polymer compound of the first or second invention to be contained in the composition of the present invention is preferably in an amount of 0.5 to 98% by weight based on the total weight of the composition.

Furthermore, as an example of the composition of the present invention, there may be mentioned a recording material containing a solvent or dispersing medium, a color material, and the polymer compound of the first or second invention.

As the recording material, there may be specifically mentioned a toner composition containing a dispersing medium such as a binder resin, a color material, and the polymer compound of the first or second invention.

Additionally, there may be mentioned an ink composition containing a solvent, a color material, and the polymer compound of the first invention.

The following will describe an ink composition which is one preferable embodiment of the present invention.

The content of the polymer compound of the above first or second invention to be contained in the ink composition of the invention is in the range of 0.1% by weight to 90% by weight. Preferred is from 1% by weight to 80% by weight. For ink-jet printers, the polymer compound is preferably used in an amount of 1% by weight to 30% by weight.

The following will describe in detail components to be contained in the ink composition of the invention other than the polymer compound. The other components include an organic solvent, water, an aqueous solvent, a color material, an additive, and the like.

[Organic Solvent]

As the organic solvent there may be mentioned hydrocarbon solvents, aromatic solvents, ether solvents, ketone solvents, ester solvents, amide solvents, and the like.

[Water]

As the water to be contained in the present invention, preferred are ion-exchange water wherein metal ions are removed, pure water, and untrapure water.

[Aqueous Solvent]

Examples of the aqueous solvent include polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; nitrogen-containing solvents such as N-methyl-2-pyrrolidone, substituted pyrrolidones, and triethanolamine; and the like. In addition, for the purpose of accelerating the drying of an aqueous dispersion on a recording media, monohydric alcohols such as methanol, ethanol, and isopropyl alcohol can also be employed.

In the ink composition of the present invention, the above organic solvent, water, and an aqueous solvent are preferably used in the range of 20 to 95% by weight based on the total weight of the ink composition. More preferred is the range of 30 to 90% by weight.

[Color Material]

The ink composition of the present invention contains a color material such as pigment, dye, and the like, and pigment is preferably employed.

The following will show specific examples of the pigment and dye to be employed in the ink composition.

The pigment may be any of an organic pigment and an inorganic pigment. As the pigment to be used in ink, a black pigment and three-primary-color pigments of cyan, magenta, and yellow can preferably be used. In this connection, color pigments other than those mentioned above, colorless or pale color pigments, metallic luster pigments, and the like may be used. Moreover, a newly synthesized pigment for the present invention may be also employed.

The following will exemplify commercially available pigments in black, cyan, magenta, and yellow.

As the black pigment, there may be mentioned Raven 1060 (trade name, manufactured by Columbian Carbon), MOGUL-L (trade name, manufactured by Cabot), Color Black FW1 (trade name, manufactured by Degussa), MA100 (trade name, manufactured by Mitsubishi Chemical Corporation), and the like but the pigment is not limited thereto.

As the cyan pigment, there may be mentioned C. I. Pigment Blue-15:3, C. I. Pigment Blue-15:4, C. I. Pigment Blue-16, and the like, but the pigment is not limited thereto.

As the magenta pigment, there may be mentioned C. I. Pigment Red-122, C. I. Pigment Red-123, C. I. Pigment Red-146, and the like but the pigment is not limited thereto.

As the yellow pigment, there may be mentioned C. I. Pigment Yellow-74, C. I. Pigment Yellow-128, C. I. Pigment Yellow-129, and the like, but the pigment is not limited thereto.

Additionally, in the ink composition of the present invention, a self-dispersible pigment in water can be also used. As the water-dispersible pigment, there are a pigment utilizing a steric hindrance effect wherein a polymer is adsorbed on the pigment surface and a pigment utilizing an electrostatic repulsive force and, as commercially available products, there may be mentioned CAB-0-JET200, CAB-0-JET300 (trade names, both manufactured by Cabot), Microjet Black CW-1 (trade name, Orient Chemical), and the like.

The amount of the pigment to be used in the ink composition of the present invention is preferably from 0.1 to 50% by weight based on the total weight of the ink composition. This range is preferred because when the amount of the pigment is 0.1% by weight or more, a sufficient image density can be obtained and when it is 50% by weight or less, the pigment is dispersed without aggregation. More preferred is the range of 0.5 to 30% by weight.

Moreover, in the ink composition of the present invention, dye can be also employed. Use can be made of direct dye, acid dye, basic dye, reactive dye, water-soluble dye or oil-soluble dye of food color, or insoluble coloring matter of disperse dye, as mentioned below.

Examples of the water-soluble dye include direct dye such as C. I. Direct Black, -17, -62, -154; C. I. Direct Yellow, -12, -87, -142; C. I. Direct Red, -1, -62, -243; C. I. Direct Blue, -6, -78, -199; C. I. Direct Orange, -34, -60; C. I. Direct Violet, -47, -48; C. I. Direct Brown, -109; C. I. Direct Green, -59; acid dye such as C. I. Acid black, -2, -52, -208; C. I. Acid Yellow, -11, -29, -71; C. I. Acid Red, -1, -52, -317; C. I. Acid Blue, -9, -93, -254; C. I. Acid Orange, -7, -19; C. I. Acid Violet, -49; reactive dye such as C. I. Reactive Black, -1, -23, -39; C. I. Reactive Yellow, -2, -77, -163; C. I. Reactive Red, -3, -111, -221; C. I. Reactive Blue, -2, -101, -217; C. I. Reactive Orange, -5, -74, -99; C. I. Reactive Violet, -1, -24, -38; C. I. Reactive Green, -5, -15, -23; C. I. Reactive Brown, -2, -18, -33; C. I. Basic Black, -2; C. I. Basic Red, -1, -12, -27; C. I. Basic Blue, -1, -24; C. I. Basic Violet, -7, -14, -27; C. I. Food Black, -1, -2; and the like.

Moreover, as the oil-soluble dye, the following will exemplify commercially available products.

As black oil-soluble dye, C. I. Solvent Black-3, -22:1, -50, and the like may be mentioned, but the dye is not limited thereto.

As yellow oil-soluble dye, C. I. Solvent Yellow-1, -25:1, -172, and the like may be mentioned, but the dye is not limited thereto.

As orange oil-soluble dye, C. I. Solvent Orange-1, -40:1, -99, and the like may be mentioned, but the dye is not limited thereto.

As red oil-soluble dye, C. I. Solvent Red-1, -111, -229, and the like may be mentioned, but the dye is not limited thereto.

As violet oil-soluble dye, C. I. Solvent Violet-2, -11, -47, and the like may be mentioned, but the dye is not limited thereto.

As blue oil-soluble dye, C. I. Solvent Blue-2, -43, -134, and the like may be mentioned, but the dye is not limited thereto.

As green oil-soluble dye, C. I. Solvent Green-1, -20, -33, and the like may be mentioned, but the dye is not limited thereto.

As brown oil-soluble dye, C. I. Solvent Brown-1, -12, -58, and the like may be mentioned, but the dye is not limited thereto.

The dye to be used in the ink composition of the present invention is preferably used in an amount of 0.1 to 50% by weight based on the weight of the ink.

[Additive]

To the composition of the present invention, if necessary, various additives, auxiliaries, and the like can be added. As one additive, there is a dispersion stabilizer which stabilizes the pigment in the solvent. The composition of the invention has a function of dispersing granular solids such as pigment by the polymer containing a polyvinyl ether structure but, in the case that the dispersion is insufficient, another dispersion stabilizer may be added.

As the other dispersion stabilizer, it is possible to use a resin having both of a hydrophilic part and a hydrophobic part or a surfactant. As a resin having both a hydrophilic part and a hydrophobic part, a copolymer of a hydrophilic monomer with a hydrophobic monomer may be mentioned, for example.

The hydrophilic monomer includes acrylic acid, methacrylic acid, maleic acid, fumaric acid, or monoesters of the above carboxylic acids, vinylsulfonic acid, styrenesulfonic acid, vinyl alcohol, acrylamide, methacryloyloxyethyl phosphate, and the like. The hydrophobic monomer includes styrene derivatives such as styrene and α-methylstyrene, vinylcylohexane, vinylnaphthalene derivatives, acrylate esters, methacryalte esters, and the like. As the copolymer, those having various structures such as random, block, and graft copolymers can be used. Of course, both of the hydrophilic and hydrophobic monomers are not limited those mentioned above.

As the surfactant, anionic, nonionic, cationic, amphoteric surfactants can be employed. The anionic surfactant includes fatty acid salts, alkyl sulfate salts, alkylarylsulfonate salts, alkyldiaryl ether disulfonate salts, dialkylsulfosuccinate salts, alkyl phosphate salts, naphthalenesulfonic acid formalin condensates, polyoxyethylenealkyl phosphate ester salts, glycerol borate fatty acid esters, and the like. The nonionic surfactant includes polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-based surfactants, silicon-based surfactants ones, and the like. The cationic surfactant includes alkylamine salts, quaternary ammonium salts, alkylpyridinium salts, alkylimidazolium salts, and the like. The amphoteric surfactant includes alkyl betaines, alkylamine oxides, phosphatidylcholine, and the like. In this connection, the surfactant is also not limited those mentioned above.

Furthermore, to the composition of the present invention, an aqueous solvent can be added, if necessary. Particularly in the case that the composition is used as ink-jet ink, the aqueous solvent is used for the purpose of preventing the drying of ink at a nozzle part and the solidification of ink, and can be used solely or in combination. The aqueous solvents mentioned in the above can be all used as the aqueous solvent. In the case of ink, the content of the aqueous solvent is in the range of 0.1 to 60% by weight, preferably 1 to 40% by weight based on the total weight of the ink.

As the other additives, for example, in the case of the application as ink, use can be made of a pH regulator for stabilizing ink and obtaining the stability, with a ink supplying pipes, of ink in a recording apparatus, a penetrant which accelerates the penetration of ink into recording media and accelerates apparent drying, an antifungal agent which prevents the generation of mold in ink, a chelating agent which sequesters metal ions in ink and prevents the precipitation of metals in the nozzle part and the precipitation of insoluble matter in ink, an antifoaming agent which prevents the circulation or transfer of a recording liquid or foam generation at the production of a recording liquid, an antioxidant, a fungicide, a viscosity regulator, a conducting agent, a UV absorber, and the like.

The ink composition of the invention can be prepared by mixing the above constitutive components and dissolving or dispersing them homogeneously. For example, the composition can be prepared by mixing a plurality of the constitutive components, crushing and dispersing them by means of a sand mill, ball mill, homogenizer, nanomaser, or the like to form an ink mother liquid, and then adjusting physical properties by adding a solvent and additives thereto.

The following will describe the toner composition of the present invention. Specifically, the toner composition contains a dispersing medium for a binder resin and the like, a color material, and the polymer compound of any of the above first and second inventions.

The content of the polymer compound of any of the above first and second inventions to be contained in the toner composition of the present invention is in the range of 0.1% by weight to 95% by weight. Preferred is from 0.5% by weight to 80% by weight.

Moreover, the polymer composition of the present invention can be used as the binder resin itself or can be used together with a binder resin such as a styrene-acrylic resin or a polyester resin.

The following will describe components to be contained in the toner composition of the present invention other than the polymer compound. The other components include a binder resin, a color matter (pigment, dye), an electrostatic regulator, a releasing agent, an external additive, magnetic particles, and the like.

Examples of the binder resin include styrene-acrylic copolymers, polyesters, polycarbonates, and the like. The content of the binder resin to be used is preferably from 10% by weight to 99% by weight. As the color matter, pigment and dye described in the description of the above ink composition can be employed. The content of the color matter to be used is from 0.1% by weight to 50% by weight. Examples of the electrostatic regulator include metal-azo complexes, triphenylmethane-based dye, nigrosine, ammonium salts, and the like. The content of the electrostatic regulator to be used is from 0.1% by weight to 30% by weight. As other components, examples of the releasing agent include synthetic wax and natural wax. Examples of the external additive include inorganic fine particles such as silica, alumina, and titania and resin fine particles such as polyvinylidene fluoride (PVDF) and polytetrafluoroethylene. Examples of the magnetic particles include magnetite, hematite, ferrite, and the like. The toner composition can function even when all the above components are not necessarily contained, and the composition may contain component(s) which are not described in the above.

As the process for preparing the toner of the present invention, for example, after the constitutive components mentioned above are mixed and melt-kneaded to effect homogeneous mixing, the mixture is crushed by a speed mill or a jet mill to prepare a toner and classified to obtain a desired size of toner. The toner composition can be prepared by adding an external additive to the toner and mixing them by a mixer.

The following will describe the ink-applying process and ink-applying apparatus using the composition of the present invention.

[Ink-Applying Process and Ink-Applying Apparatus]

The composition of the present invention can be used in various ink-applying processes such as various printing processes, an ink-jet process, an electrophotographic process and apparatus, and an image can be depicted by the ink-applying process using the apparatus. Moreover, in the case of using a liquid composition, a fine pattern can be formed by an ink-jet process or the like and also the composition can be used in a liquid-applying process for the administration of drugs.

The ink-applying process of the present invention is a process for forming an excellent image with the composition of the invention. The ink-applying process of the present invention is preferably an ink-applying process wherein a recoding is conducted by applying the ink composition of the invention on a medium to be printed by ejecting it from an ink ejecting portion. For the image formation, an ink-jet process wherein ink is ejected by imparting heat energy to the ink is preferably employed.

As ink-jet printers using the ink-jet ink composition of the present invention, various kinds of ink-jet recording apparatus such as a piezo ink-jet method using a piezoelectric element and a bubble-jet (registered trademark) method wherein recording is conducted by imparting heat energy to ink to generate foam can be employed.

The following will outline the ink-jet recording apparatus with reference to FIG. 1. However, FIG. 1 is only one example of a constitution and does not limit the present invention.

FIG. 1 shows the case where that recording is conducted on a medium to be recorded by moving a head. In FIG. 1, an X direction drive motor 56 and a Y direction drive motor 58 for driving the head 70 in X and Y directions are connected to a CPU 50 which controls the whole actions of the production apparatus through an X motor drive circuit 52 and a Y motor drive circuit 54. According to the direction of the CPU, the X direction drive motor 56 and the Y direction drive motor 58 are driven through the X motor drive circuit 52 and the Y motor drive circuit 54, whereby the position of the head 70 to the medium to be recorded is determined.

As shown in FIG. 1, a head drive circuit 60 is connected to the head 70 in addition to the X direction drive motor 56 and the Y direction drive motor 58 and the CPU 50 controls the head drive circuit 60 to effect the driving of the head 70, i.e., the ejection of the ink-jet ink. Furthermore, an X encoder 62 and a Y encoder 64 for detecting the position of the head are connected to the CPU 50 and the position information of the head 70 is inputted. Moreover, a controlling program is also inputted in a program memory 66. The CPU 50 moves the head 70 based on the controlling program and the position information of the X encoder 62 and the Y encoder 64 to arrange the head at a desired position on the medium to be recorded and then the ink-jet ink is ejected. Thus, a desired image can be depicted on the medium to be recorded. In the case of an image recording apparatus capable of mounting two or more ink-jet inks, a desired image depiction can be effected on the medium to be recorded by conducting the above operations at determined times for each ink-jet ink.

Additionally, after ejection of the ink-jet ink, if necessary, the head 70 can be moved to a position where a removing means for removing an excess ink attached to the head (not shown in the figure) to clean the head 70 by wiping or the like. As a specific method for the cleaning, a conventional method can be used without modification.

When the image depiction is completed, by means of a transferring mechanism of the media to be recorded, the depicted medium to be recorded is replaced by a new medium to be recorded.

In the present invention, it is possible to modify or change the above embodiment without deviating from the gist of the invention. For example, the above description shows an example wherein the head 70 is moved in the directions of X and Y axes but the image depiction may be effected by moving the head 70 only in the direction of X axis (or in the direction of Y axis) and moving the medium to be recorded in the direction of Y axis (or in the direction of X axis) while the motions are interlocked.

In the present invention, an excellent effect is provided by a head which possesses a means for generating heat energy utilized as energy for ejecting the ink-jet ink (e.g., electricity-heat converter, laser light, etc.) and which ejects the ink-jet ink by the above heat energy. By such a method, highly fine image depiction can be achieved. By using the ink-jet ink composition of the present invention, even more excellent image depiction can be effected.

The representative constitution and principle of the above apparatus possessing a means for generating heat energy may be preferably those using a basic principle disclosed in U.S. Pat. Nos. 4,723,129 and 4,740,796. This method is applicable to both of the so-called on-demand type recordings and continuous type recordings. Particularly in the case of the on-demand type, by imparting at least one drive signal which corresponds to an ejection information and causes a rapid temperature elevation exceeding nucleate boiling to an electricity-heat converter which retains a liquid and is arranged corresponding to a flow passage, heat energy can be generated at the electricity-heat converter to cause film boiling on the thermally acting surface of the head and, as a result, a one-to-one correspondence between a bubble and the drive signal can be formed in the liquid, so that this method is effective. The liquid is ejected through an ejection opening by the growth and shrinkage of the bubble to form at least one drop. When the drive signal is in a pulse form, the growth and shrinkage of the bubble is immediately and suitably effected and hence ejection of the liquid particularly excellent in responsiveness responsibility can be achieved, so that the case is more preferred. As the drive signal in a pulse form, those described in U.S. Pat. Nos. 4,463,359 and 4,345,262 are suitable. In this connection, when the conditions described in U.S. Pat. No. 4,313,124 relating to the temperature elevation rate of the above thermally acting surface is adopted, even more excellent ejection can be conducted.

As the constitution of the head, in addition to the constitution of the combination of an ejection outlet, a liquid passage, and an electricity-heat converter (a linear liquid passage or a rectangular liquid passage), a constitution using U.S. Pat. Nos. 4,558,333 and 4,459,600 which disclose a constitution that the thermally acting part is arranged in a bending region, is also included in the present invention. Additionally, even when a constitution based on JP-A-59-123670 disclosing a constitution that a slit common to a plurality of the electricity-heat converters is used as an ejection port of the electricity-heat converters or JP-A-59-138461 disclosing a constitution that an opening which absorbs a pressure wave of heat energy corresponding to the ejection port are employed, the effects of the invention is effective. Namely, even when the head has any form, the ejection of the ink-jet ink can be reliably and efficiently conducted according to the present invention.

Furthermore, the present invention can be effectively applied to a full-line type head corresponding to the maximum width of the medium to be recorded in the ink-applying apparatus of the invention. Such a head may be either a constitution which satisfies the length with a combination of two or more heads or a constitution as one head which is formed in an integrated fashion Additionally, even in a serial type apparatus, the present invention is also effective in the case of using a head fixed to the main body of the apparatus or a freely replaceable chip-type head wherein an electric connection to and ink supply from the main body of the apparatus becomes possible when it is mounted on the main body of the apparatus.

Furthermore, the apparatus of the present invention may also further have a liquid drop-removing means. When such a means is attached, an even more excellent ejection effect can be realized.

Moreover, as a constitution of the apparatus of the present invention, the addition of a preliminary auxiliary means or the like is preferred since the effects of the invention can be further stabilized. Specific examples thereof include a capping means for the head, a pressurizing or suctioning means, a preliminary heating means which achieves heating using an electricity-heat converter or another heating element or a combination thereof, a preliminary ejection means for ejection other than the ink ejection, and the like.

The most effective mode for the present invention is one conducting the aforementioned film boiling method.

In the apparatus of the present invention, the amount of the ink to be ejected from each ejection outlet of the ejection head for ink-jet ink is preferably in the range of 0.1 pL to 100 pL.

Moreover, the ink composition of the present invention can be employed in an indirect recording apparatus using a recording method wherein ink is printed on an intermediary transferring material and then the print is transferred to a recording medium such as paper. Moreover, it is also applicable to an apparatus utilizing an intermediary transferring material by a direct recording method.

EXAMPLES

The following will describe the present invention in detail with reference to Examples but the invention is not limited to these Examples.

Example 1

Synthesis of Triblock Polymer 1

Synthesis of a triblock polymer composed of a block segment of a random copolymer of isobutyl vinyl ether (IBVE) and biphenyloxyethyl vinyl ether (VEEtPhPh) (A block), a block segment of a polymer of 2-t-butyldimethylsiloxyethyl vinyl ether (tBDMSiOVE) (B block), and a block segment of a polymer of ethyl 4-{(2-vinyloxy)ethoxy}benzoate (VEEtPhCOOEt) (C block) is described below.

After the inside volume of a glass vessel fitted with a three-way stop cock was replaced by nitrogen, the vessel was heated to 250° C. under a nitrogen gas atmosphere to remove adsorbed water. After the system was returned to room temperature, 2.5 mmol of IBVE, 2.5 mmol of VEEtPhPh, 16 mmol of ethyl acetate, 0.05 mmol of 1-isobutoxyethyl acetate, and 11 ml of toluene were added and the reaction system was cooled. When the temperature in the system reached 0° C., 0.2 mmol of ethylaluminum sesquichloride (an equimolar mixture of diethyl aluminum chloride and ethyl aluminum dichloride) was added and the polymerization was initiated. The molecular weight was monitored in a time-division manner using gel permeation chromatography (GPC) and the completion of the polymerization of the A block was confirmed. At this stage, Mn was 12,700 and Mw/Mn was 1.16.

Then, 10 mmol of tBDMSiOVE as a monomer of the B block was added and the polymerization was continued. After completion of the polymerization of the B block was confirmed by the monitoring using GPC (Mn=33,200 and Mw/Mn=1.24 at this stage), 10 mmol of VEEtPhCOOEt as a monomer of the C block was added and the polymerization was continued. After 24 hours, the polymerization was terminated (rate of polymerization of VEEtPhCOOEt: 33%). The termination of the polymerization was effected by adding a 0.3% by weight aqueous ammonia/methanol solution. The reaction mixture solution was diluted with dichloromethane and washed with 0.6M hydrochloric acid three times and then with distilled water three times. From the product obtained by concentrating the resulting organic phase to dryness using an evaporator and drying the residue under vacuum, the triblock polymer as an objective product was isolated. The identification of the triblock polymer was conducted using NMR and GPC. Mn was 39,100 and Mw/Mn was 1.25. The ratio of the degree of polymerization of A:B:C was 100:200:34. The ratio of the degree of polymerization of two monomers in the A block was 1:1.

Example 2

Synthesis of Triblock Polymer 2

Synthesis of a triblock polymer composed of a block segment of a random copolymer of isobutyl vinyl ether (IBVE) and biphenyloxyethyl vinyl ether (VEEtPhPh) (A block), block segment of a polymer of 2-t-butyldimethylsiloxyethyl vinyl ether (tBDMSiOVE) (B block), and a block segment of a polymer of ethyl 4-{(2-vinyloxy)ethoxy}benzoate (VEEtPhCOOEt) (C block) is described below.

Polymerization was carried out in the same manner as in Example 1 except that 5.0 mmol of tBDMSiOVE of the B block was used. By the monitoring using GPC, there was observed Mn=11,800 and Mw/Mn=1.14 at the stage of the completion of the polymerization of the A block and Mn=22,700 and Mw/Mn=1.23 at the stage of the completion of the polymerization of the B block, and the polymerization reaction of C block was terminated at the time when the rate of polymerization was 20%. The post treatment of the polymerization was conducted in the same manner as in Example 1. From the product obtained by concentrating the resulting organic phase to dryness by an evaporator and drying the residue under vacuum, the triblock polymer as an objective product was isolated. The identification of the triblock polymer was conducted using NMR and GPC. Mn was 29,400 and Mw/Mn was 1.23. The ratio of the degree of polymerization of A:B:C was 100:100:22. The ratio of the degree of polymerization of two monomers in the A block was 1:1.

Example 3

The polymer compound (polymer) synthesized in Example 1 was stirred at room temperature (23° C.) for 40 hours together with 5N sodium hydroxide to hydrolyze the ester. After neutralization with 0.1N hydrochloric acid, extraction with methylene chloride, and drying, the solvent was removed by evaporation to obtain a free carboxylic acid polymer. When the polymer was dissolved in deuterated DMF and measured on NMR, it was confirmed that the carboxylate ester was completely hydrolyzed and the silyl ether group almost entirely remained. Thereafter, the polymer was rapidly neutralized with an equivalent amount of 1N sodium hydroxide and water was removed by evaporation to obtain a polymer of sodium carboxylate salt.

Example 4

A free carboxylic acid polymer and a polymer of sodium carboxylate salt were obtained by hydrolyzing the polymer compound synthesized in Example 2 and extracting the product in the same manner as in Example 3.

Example 5

Tetrahydrofuran (THF) was added to each of the polymers of sodium carboxylate salts obtained in Examples 3 and 4 and an excess amount of 3.0N hydrochloric acid was added, followed by stirring. After dissolution of the polymer, ethanol was added and the whole was reacted at room temperature over a whole day to hydrolyze the silyl ether. After the reaction, THF was evaporated by an evaporator and the residue was extracted with methylene chloride in the same manner as in Example 3 to obtain a free carboxylic acid polymer having a hydroxyl group.

Moreover, a polymer of sodium carboxylate salt was obtained in the same manner as in Example 3.

Example 6

Two parts by weight of a pigment (trade name: MOGUL L; manufactured by Cabot), 3 parts by weight of the sodium carboxylate salt-type polymer compound of Example 4, and 25 parts by weight of diethylene glycol were added to 177 parts by weight of ion-exchanged water and were dispersed using an ultrasonic homogenizer. The dispersion was filtered under pressure through a 1 μm filter to prepare an ink composition. As a result of one week standing at room temperature, no precipitation was observed and the dispersibility of the pigment was relatively good.

Example 7

An ink composition was prepared in the same manner as in Example 6 using the sodium carboxylate salt-type polymer compound of Example 4. As a result of one week standing at room temperature, no precipitation was observed and the dispersibility of the pigment was very good.

Example 8

Using each of the ink compositions prepared in Examples 6 and 7, ink-jet recording was conducted. When each of the ink compositions prepared in Examples 6 and 7 was charged into the ink tank of a bubble-jet (registered trademark) printer (trade name: BJJ-800J; manufactured by Canon Inc.) and character image was recorded on standard paper using the above ink-jet printer, a clear black printing can be effected in both cases.

Example 9

A triblock polymer: poly[EOVE-b-tBMSiOVE-b-VEEtPhCOOEt] was synthesized using 5.0 mmol of 2-ethoxyethyl vinyl ether (EOVE) showing hydrophilicity at 20° C. or lower and hydrophobicity at a temperature of higher than 20° C. (upper limit temperature of hydration). Instead of the monomers of the A component: 2.5 mmol of IBVE and 2.5 mmol of VEEtPhPh as in Example 2 were used. The identification of the synthesized compound was similarly conducted using GPC and NMR and Mn was 26,200 and Mw/Mn was 1.30. The other synthetic conditions are the same as in Example 2.

The hydrolysis of the carboxylate ester and the silyl ether part was conducted in the same manner as in Example 3 and Example 5, respectively, to obtain the triblock polymer: poly[EOVE-b-HOVE-b-VEEtPhCOOEt] containing 2-hydroxyethyl vinyl ether (HOVE) having a hydroxyl group.

Moreover, 10 parts by weight of the resulting triblock polymer and 5 parts by weight of an oil-soluble dye Oil Blue N (trade name, manufactured by Aldrich) were co-dissolved in dimethylformamide and the whole was transformed into an aqueous phase using 400 parts by weight of distilled water to obtain an ink composition. Even when the composition was allowed to stand for 10 days, the Oil Blue neither separated nor precipitated.

Furthermore, when the dye-dispersed composition was cooled to 10° C. to break polymer micelles and dissolve the polymer in water, the dye and the dye solution separated and the aqueous layer became colorless. From this fact, it was confirmed that the color material was encapsulated.

Comparative Example 1

Using sodium carboxylate salt of an acrylic acid-styrene-acrylic acid triblock copolymer (Mn=18,500, Mw/Mn=1.33, acrylic acid/styrene/acrylic acid=50/60/50 (monomer unit ratio)) as a polymer, an ink composition of Comparative Example 1 was obtained in the same manner as in Example 6.

Character image was recorded on standard paper with each of the ink compositions prepared in Example 7 and the ink composition prepared in Comparative Example 1 using the above ink-jet printer and the color density (O.D.) of the image was evaluated. When the color density (O.D.) of each of the resulting images was measured by means of a reflective densitometer (trade name: RD-19A; manufactured by Sakata Inx Corp.), it was 1.05 in the case of the ink of Example 5 and 0.58 in the case that the acrylic acid-styrene-acrylic acid triblock copolymer of Comparative Example 1 was used. When both compositions were compared, since the dispersibility of the latter ink composition was bad, results of bad ejection property and low color density (O.D.) of the printed image were obtained.

Comparative Example 2

Using each of the ink compositions prepared in Examples 6 and 7, character image was recorded on standard paper. When a line marker test was conducted one minute after the printing, no tailing was observed at the printed articles of Examples 6 and 7. On the other hand, when the ink composition containing sodium carboxylate salt of the acrylic acid-styrene-acrylic acid triblock copolymer as a polymer prepared in Comparative Example 1 was similarly printed on standard paper and a line marker test was conducted after one minute, black tailing was clearly observed.

Example 10

Using the free carboxylic acid polymers which are precursors of the sodium carboxylate polymers obtained in Example 4 and 5, toner compositions were prepared as follows, respectively.

Ten parts by weight of a polyester resin (synthesized from bisphenol A, terephthalic acid, n-dodecenylsuccinic acid, trimellitic acid, and diethylene glycol in a molar ratio of 20:38:10:5:27), 70 parts by weight of magnetite ($Fe_3O_4$), 3 parts by weight of the aforementioned free carboxylic acid polymer, 2 parts by weight of triphenylmethane-based dye, and 3 parts by weight of low-molecular-weight polypropylene were preliminarily mixed and then melt-kneaded by an extrude. After cooling, it was roughly crushed by a speed mill, then finely pulverized by a jet mill, and further classified by means of a zigzag classifier to obtain a toner having a volume-average diameter of 11 μm.

To 100 parts by weight of the toner were added 0.4 parts by weight of positively charged hydrophobic dry silica treated with an amino-modified silicone oil (viscosity at 25° C. of 100 cp, amine equivalent of 800) and 0.2 parts by weight of spherical PVDF particles having an average particle size of 0.2 μm, and the whole was mixed in a Henschel mixer to obtain a positively charged toner composition. When printing was conducted on a copying machine (trade name NP-3525; manufactured by Canon Inc.) using each of the toner compositions, clear printing could be obtained in both cases.

INDUSTRIAL APPLICABILITY

Since the polymer compound of the present invention can disperse functional substances such as a color material and solid matter satisfactorily, the above polymer compound can be utilized in compositions such as an ink composition and a toner composition and recording materials by mixing the compound with a dispersing medium and a color material.

Moreover, the recording materials such as an ink composition and a toner composition using the polymer compound of the invention can be utilized in an ink-applying process and ink-applying apparatus such as an ink-jet recording apparatus.

This application claims priority from Japanese Patent Application No. 2004-139193 filed May 7, 2004, which is hereby incorporated by reference herein.

What is claimed is:

1. A polymer compound of a block polymer containing at least three block segments each having a repeating unit structure comprising a polyalkenyl ether structure, comprising a repeating unit structure represented by the following general formula (1) in at least one block segment of the block polymer and a repeating unit structure represented by the following general formula (2) in at least one other block segment:

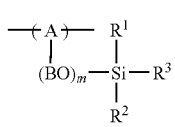

General formula (1)

wherein A represents a polyalkenyl ether group which may be substituted; B represents a linear or branched alkylene group having 1 to 15 carbon atoms which may be substituted; m represents an integer of 1 to 30 and, in the case that m is two or more, the B groups may be the same or different from each other; $R^1$, $R^2$, and $R^3$ represent each a linear or branched alkyl group having 1 to 10 carbon atoms which may be substituted or an aromatic ring which may be substituted, at least one of $R^1$, $R^2$, and $R^3$ having a t-butyl group or a phenyl group; and $R^1$, $R^2$, and $R^3$ may be the same in structure or different in structure from each other;

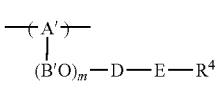

General formula (2)

wherein A' represents a polyalkenyl ether group which may be substituted; B' represents a linear or branched alkylene group having 1 to 15 carbon atoms which may be substituted; m represents an integer of 1 to 30 and, in the case that m is two or more, the B' groups may be the same or different from each other; D represents a single bond or a linear or branched alkylene group having 1 to 10 carbon atoms which may be substituted; E represents any of a single bond, an aromatic ring which may be substituted, a condensed ring which may be substituted, or a structure comprising up to three aromatic rings, which may be substituted, that are bonded via single bond(s); $R^4$ represents —COOH, —COOR$^5$, or —COO$^-$M; $R^5$ represents a linear or branched alkyl group having 1 to 5 carbon atoms which may be substituted or an aromatic ring which may be substituted; M represents a monovalent or multivalent metal cation; and in the case that the aromatic ring of the above E is substituted at a hydrogen atom(s), the hydrogen atom(s) is substituted by halogen atom(s).

2. The polymer compound according to claim 1, wherein the above at least three block segments have block segments A, B, and C and A is a hydrophobic block segment, B is a block segment containing a repeating unit structure represented by the general formula (1), and C is a block segment containing a repeating unit structure represented by the general formula (2).

3. A process for producing a polymer compound comprising a step of obtaining a block segment containing a repeating unit structure represented by the following general formula (3) by hydrolyzing a silyl ether side chain of —SiR$_1$R$_2$R$_3$ of the repeating unit structure represented by the general formula (1) in the polymer compound according to claim 1 or 2 into a hydroxyl group

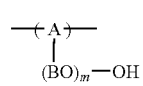

General formula (3)

wherein A represents a polyalkenyl ether group which may be substituted; B represents a linear or branched alkylene group having 1 to 15 carbon atoms which may be substituted; m represents an integer of 1 to 30 and, in the case that m is two or more, the B groups may be the same or different from each other.

4. A polymer-containing composition comprising the polymer compound according to claim 1 or 2, a solvent or dispersing medium, and a functional substance.

5. The polymer-containing composition according to claim 4, wherein the above functional substance is encapsulated in the above polymer compound.

6. A toner composition comprising the polymer compound according to claim 1 or 2, a dispersing medium, and a color material.

7. An ink composition comprising the polymer compound according to claim 1 or 2, a solvent or dispersing medium, and a color material.

8. An ink-applying process comprising a step of applying the ink composition according to claim 7 to a medium.

* * * * *